United States Patent
Huynh

(10) Patent No.: US 8,690,097 B1
(45) Date of Patent: Apr. 8, 2014

(54) VARIABLE-GEOMETRY ROTATING SPIRAL CONE ENGINE INLET COMPRESSION SYSTEM AND METHOD

(75) Inventor: Thuy Huynh, Ofallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/459,647

(22) Filed: Apr. 30, 2012

(51) Int. Cl.
*B64D 33/02* (2006.01)

(52) U.S. Cl.
USPC ........................................................ 244/53 B

(58) Field of Classification Search
USPC ........ 244/53 B, 35 A; 137/15.1, 15.2; 60/767, 60/768
See application file for complete search history.

(56) References Cited

U.S. PATENT DOCUMENTS

| | | | |
|---|---|---|---|
| 3,815,360 A * | 6/1974 | Wellinitz | 60/264 |
| 3,882,674 A * | 5/1975 | Taggart | 60/221 |
| 3,974,648 A | 8/1976 | Kepler | |
| 3,993,463 A * | 11/1976 | Barr | 55/306 |
| 4,438,741 A * | 3/1984 | Okumura et al. | 123/188.14 |
| 4,502,651 A * | 3/1985 | Jungclaus et al. | 244/53 B |
| 4,909,031 A | 3/1990 | Grieg | |
| 5,301,901 A | 4/1994 | Kutschenreuter, Jr. | |
| 5,586,735 A | 12/1996 | Falempin et al. | |
| 5,749,542 A | 5/1998 | Hamstra et al. | |
| 5,779,189 A | 7/1998 | Hamstra et al. | |
| 6,003,485 A * | 12/1999 | Kawashima et al. | 123/188.14 |
| 6,371,414 B1 * | 4/2002 | Truax et al. | 244/201 |
| 6,575,404 B2 | 6/2003 | Demay et al. | |
| 6,662,548 B1 * | 12/2003 | Clark | 60/204 |
| 6,793,175 B1 | 9/2004 | Sanders et al. | |
| 7,048,229 B2 | 5/2006 | Sanders et al. | |
| 7,207,520 B2 | 4/2007 | Lundy et al. | |
| 7,399,155 B2 * | 7/2008 | Noorkami | 415/71 |
| 7,673,834 B2 * | 3/2010 | Harman | 244/199.1 |
| 7,766,279 B2 * | 8/2010 | Harman | 244/199.1 |
| 7,837,142 B2 | 11/2010 | Chase et al. | |
| 7,866,599 B2 * | 1/2011 | Elvin | 244/53 B |
| 7,967,241 B2 | 6/2011 | Chase et al. | |
| 2006/0048796 A1 * | 3/2006 | Asplund et al. | 134/21 |

* cited by examiner

*Primary Examiner* — Tien Dinh
*Assistant Examiner* — Jessica Wong
(74) *Attorney, Agent, or Firm* — Hope Baldauff, LLC

(57) ABSTRACT

The present disclosure is generally directed to a system, aircraft and a method of operation of an aircraft engine including an intake portion and an exhaust portion, an engine inlet, oriented in a forward direction to the intake portion, the engine inlet defined by a peripheral cowling that directs airflow to the intake portion of the aircraft engine, and a spiral cone positioned proximate the engine inlet, the spiral cone including a variable compression surface area that directs airflow immediately in front of the engine inlet.

20 Claims, 7 Drawing Sheets

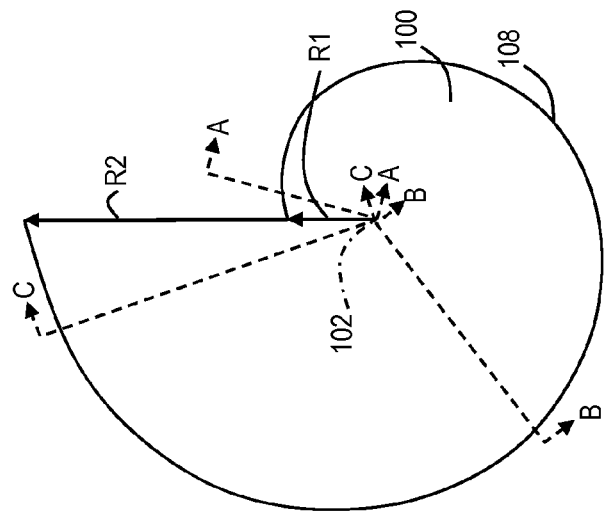
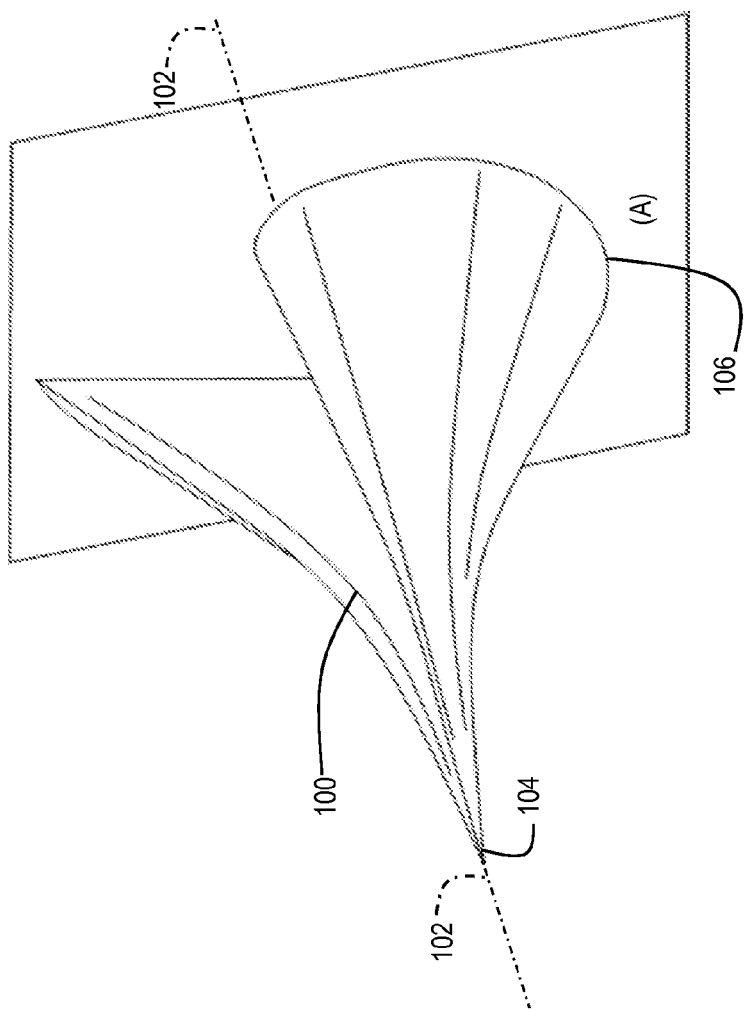
FIG. 1A
FIG. 1B

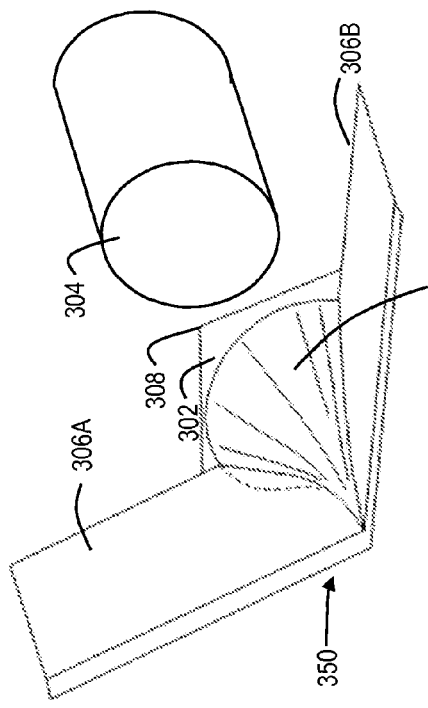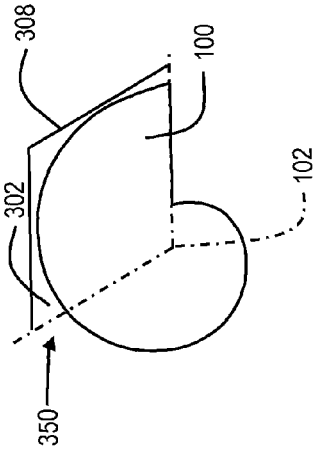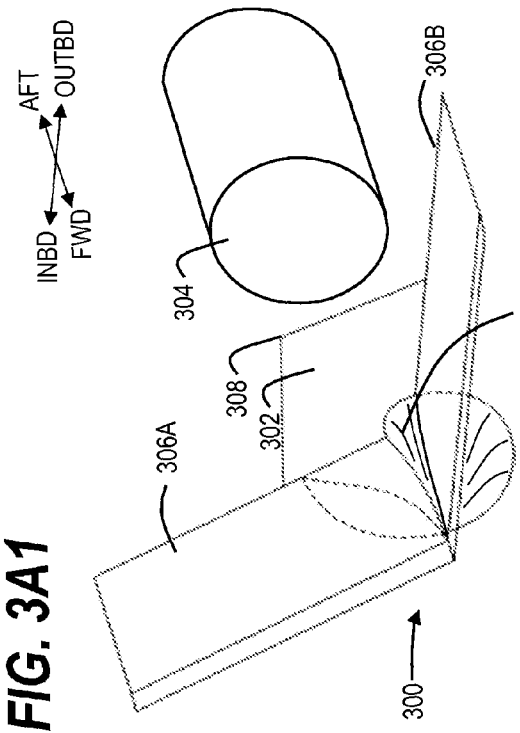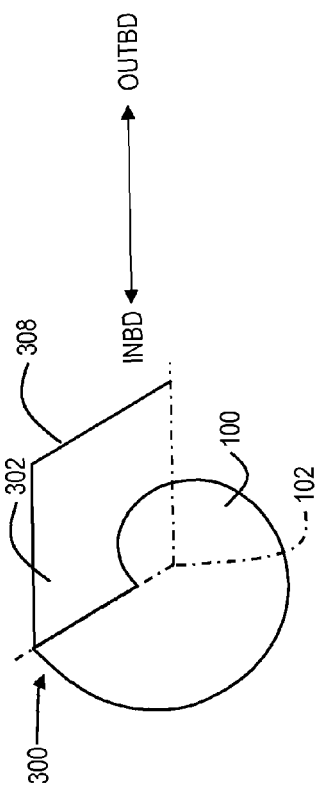
FIG. 3A1
FIG. 3A2
FIG. 3B1
FIG. 3B2

VARIABLE-GEOMETRY ROTATING SPIRAL CONE ENGINE INLET COMPRESSION SYSTEM AND METHOD

FIELD

The embodiments presented herein relate generally to supersonic aircraft engine air inlet configuration and method of operation, and more particularly to a variable-geometry rotating spiral cone engine air inlet device.

BACKGROUND

In a variety of types of aircraft, air-breathing propulsion systems such as turbojet or turbofan engines are used for propelling the aircraft at supersonic velocities. Existing commercially available gas turbine engines used for aircraft propulsion are generally designed to work where subsonic flow, typically on the order of Mach 0.3 to 0.6, exists at the inlet side of the engine. Therefore, a supersonic engine inlet must decelerate the intake supersonic air stream to a subsonic speed for input to the engine. The process of deceleration is technically known as diffusion or compression, since the excess kinetic energy of the air stream is converted into a static pressure increase. To accomplish this, the inlet must subject the air to a shock system where losses in total pressure occur that reduce the net thrust and net thermal efficiency of the engine. Inlets are typically designed to place a final terminal shock from supersonic to subsonic flow.

Supersonic aircraft engine air inlet designs must operate efficiently over a broad range of conditions from very low speeds for takeoff to very high speed cruise. A critical challenge for the successful design of supersonic aircraft is air inlet systems which can operate at low speed and high thrust conditions for takeoff and in flight conditions ranging from subsonic to transonic, and supersonic regimes. Supersonic inlets need to accommodate changing requirements with airspeed. Typically inlets incorporate a forward ramp or spike surface ahead of the enclosed portion of the inlet which presents an angle to the flow to generate a weak shock system to slow and compress the air before entering the enclosed portion of the inlet. The ideal ramp angle for such an inlet changes with Mach number. As Mach number increases, the engine will accept less air than provided by the inlet system, and the excess must be either spilled around the inlet or bypassed through auxiliary openings in the inlet internal and external surfaces.

To accomplish changing the intake airspeed at different aircraft operating speeds, typically supersonic aircraft have incorporated complex and heavy variable ramp and bypass systems to accommodate these supersonic matching problems. Improvements are needed to provide lighter, more efficient and less complex means for accommodating the diverse requirements of supersonic aircraft inlets by providing a simplified actuation mechanism that reduces overall weight and space requirements. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a system is described that includes an aircraft engine including an intake portion and an exhaust portion. An engine inlet is oriented in a forward direction and is defined by a peripheral cowling that directs airflow to the intake portion of the aircraft engine. In addition, a spiral cone is positioned proximate the engine inlet, where the spiral cone includes a variable compression surface area that directs airflow immediately in front of the engine inlet.

In another embodiment disclosed herein, an aircraft includes an aircraft body connected to a wing assembly, an engine within a portion of the aircraft body and the wing assembly. The engine includes an intake portion and an exhaust portion, and an engine inlet, defined by a peripheral cowling in another portion of the aircraft body and the wing assembly. The engine inlet is oriented in a forward direction to the intake portion. A spiral cone proximate to the engine inlet includes a variable compression surface area that compresses airflow immediately in front of the engine inlet.

In another embodiment disclosed herein, a method of operation includes, presenting a minimum compression surface area of a spiral cone at a first engine inlet airspeed to an airflow positioned forward of an engine inlet. The airflow at the first engine inlet airspeed is compressed against the minimum compression surface area for input to an intake portion of an engine. At a second engine inlet airspeed, another compression surface area of the spiral cone is presented to an airflow positioned forward of the engine inlet, the other compression surface area including a larger surface area than the minimum compression surface area of the spiral cone. An airflow at the second engine inlet airspeed is presented against the other compression surface area for input to the intake portion of the engine.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 1A illustrates an isometric perspective of a spiral cone according to at least one embodiment disclosed herein;

FIG. 1B illustrates a cross section view of a distal end of the spiral cone of FIG. 1A according to at least one embodiment disclosed herein;

FIG. 3A1 illustrates a partially exploded isometric perspective view of the spiral cone in a first position with respect to an engine according to at least one embodiment disclosed herein;

FIG. 3A2 illustrates a front view of the spiral cone in a first position with respect to an airflow inlet of an engine according to at least one embodiment disclosed herein;

FIG. 3B1 illustrates a partially exploded isometric perspective view of the spiral cone in a second position with respect to an engine according to at least one embodiment disclosed herein;

FIG. 3B2 illustrates a front view of the spiral cone in a second position with respect to an airflow inlet of an engine according to at least one embodiment disclosed herein;

DETAILED DESCRIPTION

Figure 2A:
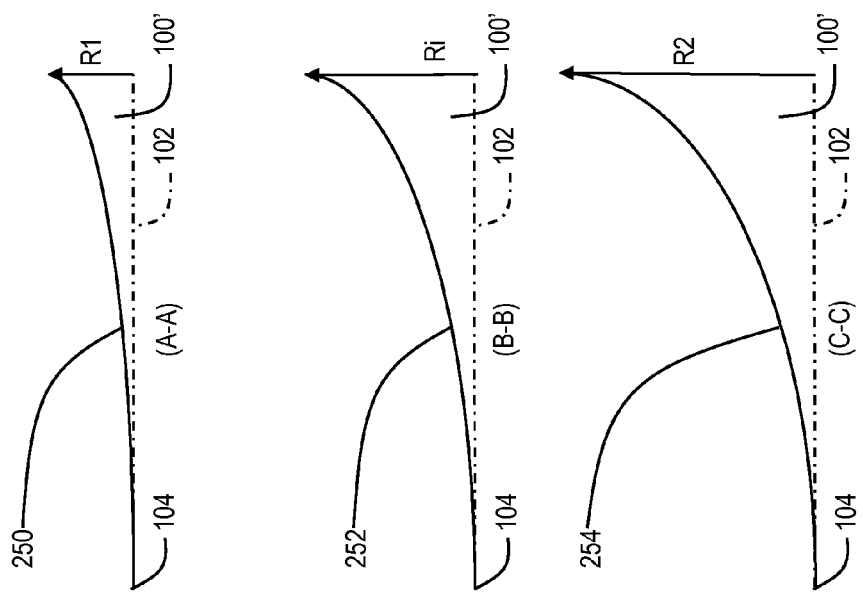
FIG. 2A illustrates a series of cross section profiles taken from lines (A-A), (B-B) and (C-C) in FIG. 1B according to at least one embodiment disclosed herein.

The following detailed description is directed to a variable-geometry rotating spiral cone engine inlet compression system for use on an aircraft and a method of operation.

FIG. 1A illustrates an isometric perspective view of a spiral cone for an embodiment presented herein, and FIG. 1B illustrates a cross section view through plane (A) of a distal end of the spiral cone of FIG. 1A. Spiral cone 100 includes a central axis of rotation 102 about which the spiral cone 100 rotates. The spiral cone 100 includes a tapered end 104 that expands in its radius along the central axis of rotation 102 to an extended end 106. FIG. 1B illustrates a cross section 108 of the spiral cone 100 taken from an intersecting plane (A) of FIG. 1A of the distal extended end 106 of the spiral cone 100. A starting radius R1 illustrates a distance from the central axis of rotation that progressively increases through 360 degrees, (FIG. 1B illustrating in a clockwise manner), until it reaches an ending radius R2, greater in dimension than the starting radius R1. A cross sectional profile of the spiral cone 100 in an orthogonal direction to the forward direction is best represented by a logarithmic spiral, although many other equivalent designs may accomplish an equivalent function.

FIG. 2A illustrates a series of cross section profiles of spiral cone 100 taken from lines (A-A), (B-B) and (C-C) in FIG. 1B. A starting surface profile 200 taken along section line A-A from FIG. 1B illustrates the starting surface profile 200 starting at the tapered end 104 of the central axis of rotation 102 and extending its radius in a linear fashion to the extended end 106 represented by the starting radius R1. An intermediate surface profile 202 taken along section line B-B from FIG. 1B illustrates the intermediate surface profile 202 starting at the tapered end 104 of the central axis of rotation 102 and extending its radius in a linear fashion to the extended end 106 represented by the intermediate radius Ri. An ending surface profile 204 taken along section line C-C from FIG. 1B illustrates the ending surface profile 204 starting at the tapered end 104 of the central axis of rotation 102 and extending its radius in a linear fashion to the extended end 106 represented by the second ending radius R2.

Figure 2B:
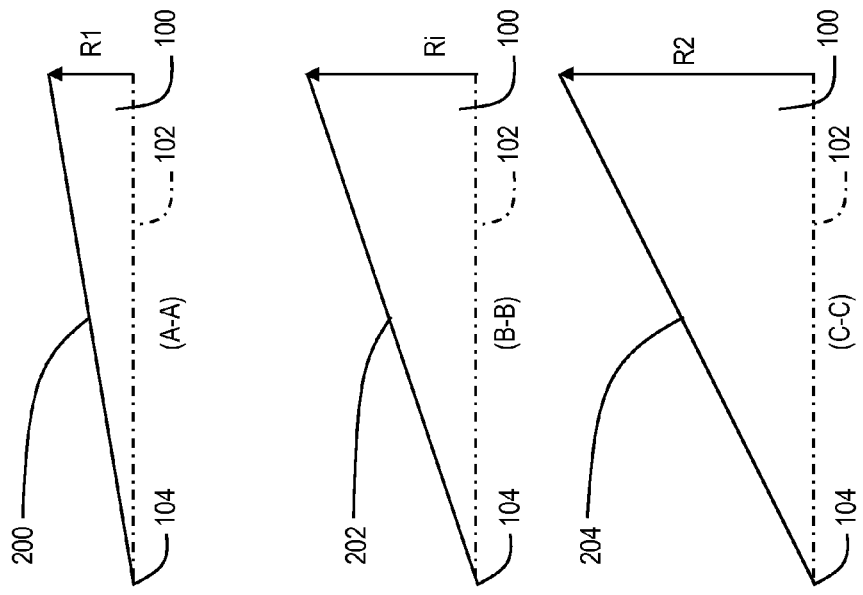
FIG. 2B illustrates an alternate series of cross section profiles taken from lines (A-A), (B-B) and (C-C) in FIG. 1B according to at least one other embodiment disclosed herein.

FIG. 2B illustrates an alternate series of cross section profiles and alternatively shaped spiral cone 100' taken from lines (A-A), (B-B) and (C-C) in FIG. 1B. A starting surface profile 250 taken along section line A-A from FIG. 1B illustrates the starting surface profile 250 starting at the tapered end 104 of the central axis of rotation 102 and extending its radius in a parabolic manner to the extended end 106 represented by the starting radius R1. An intermediate surface profile 252 taken along section line B-B from FIG. 1B illustrates the intermediate surface profile 252 starting at the tapered end 104 of the central axis of rotation 102 and extending its radius in a parabolic manner to the extended end 106 represented by the intermediate radius Ri. An ending surface profile 254 taken along section line C-C from FIG. 1B illustrates the ending surface profile 254 starting at the tapered end 104 of the central axis of rotation 102 and extending its radius in a parabolic manner to the extended end 106 represented by the ending radius R2. Note that the surface profiles of the spiral cone 100/100' may take a non-parabolic and non-linear surface profiles as well. Additionally, the surface profiles may transition between a linear and parabolic surface profiles on the same spiral cone 100/100'.

FIG. 3A1 illustrates a partially exploded isometric perspective and FIG. 3A2 illustrate a front view of the spiral cone 100 in a first position 300 with respect to an airflow inlet for an engine. FIGS. 3A1 and 3A2 particularly illustrate the spiral cone 100 in a first position 300 with respect to an engine inlet 302 of an aircraft engine compartment 304 configured to hold an aircraft engine, wherein the engine inlet 302 is defined by at least one planar portion 306A/306B of an aircraft body and/or aircraft wing assembly, (not shown), that may include a plurality of planar portions (306A/306B), or may include a single planar portion, (not shown). Engine inlet 302 is further defined by a peripheral cowling 308 that surrounds the engine inlet 302 opening to direct airflow to the aircraft engine compartment 304. The engine inlet 302 may also be defined completely by the peripheral cowling 308, as in a nacelle, (not shown), that surrounds a turbofan engine, wherein the peripheral cowling 308 surrounding the engine inlet 302 may be coupled to an aircraft engine.

In the first position 300, the spiral cone is rotated about the central axis 102 to present a minimal amount of obstruction of the spiral cone 100 in front of the engine inlet 302. The spiral cone 100 may be positioned with respect to the engine inlet 302 such that the extended end 106 of the spiral cone 100 is positioned within the engine inlet opening, or forward to the engine inlet opening. This first position 300 presents a smallest amount of compression surface area 310 in front of the engine inlet 302 to reduce the airflow speed as it approaches the engine inlet 302. This first position 300 is effective for aircraft airspeeds from Mach 0 to approximately Mach 1.5. As the aircraft airspeed continues to increase above a predetermined airspeed, as described below, the spiral cone 100 rotates, (in this case, in a counter-clockwise direction) about central axis of rotation 102 such that more compression surface area of the spiral cone 100 is presented before the engine inlet 302, thus presenting an ever increasing greater obstruction as the outer compression surface of the spiral cone 100 increases.

FIG. 3B1 illustrates a partially exploded isometric perspective and FIG. 3B2 illustrate a front view of the spiral cone 100 in a second position 350 similar to FIGS. 3A1 and 3A2. FIGS. 3B1 and 3B2 particularly illustrate the spiral cone 100 in a second position 350 with respect to an engine inlet 302 of an aircraft engine compartment 304. This second position 350 is effective for aircraft airspeeds greater than approximately Mach 2.5. At airspeeds above this value, a maximum amount of compression surface area 312 of the spiral cone 100 is presented before the engine inlet 302 to obstruct the maximum amount of area in front of the engine inlet 302.

In summary, an embodiment presented herein includes a system having an aircraft engine compartment 304 with an intake portion and an exhaust portion, an engine inlet 302 oriented in a forward direction to the engine intake portion, where the engine inlet 302 defined by a peripheral cowling 308 that directs airflow to the intake portion of the aircraft engine compartment 304. The system further includes a spiral cone 100 positioned proximate the engine inlet 302, the spiral cone 100 including a variable compression surface area 310/

312 that directs airflow immediately in front of the engine inlet 302. The spiral cone 100 may include a radius R1/R2 that increases one of linearly and parabolically in a forward-to-aft direction along a central rotational axis 302 about which it rotates. The spiral cone 100 may also rotate between a first position 300 at a first engine inlet airspeed, and a second position 350 at a second engine inlet airspeed. The first position 300 of the spiral cone 100 obstructs a first portion of area of the engine inlet 302, and the second position 350 of the spiral cone obstructs the first portion of area and a second portion of area of the engine inlet 302. The variable compression surface area of the spiral cone 100 moves between a smallest amount of compression surface area 310 and a maximum amount of compression surface area 312, the second compression surface area 312 being larger than smallest amount of compression surface area 310.

Figure 4:
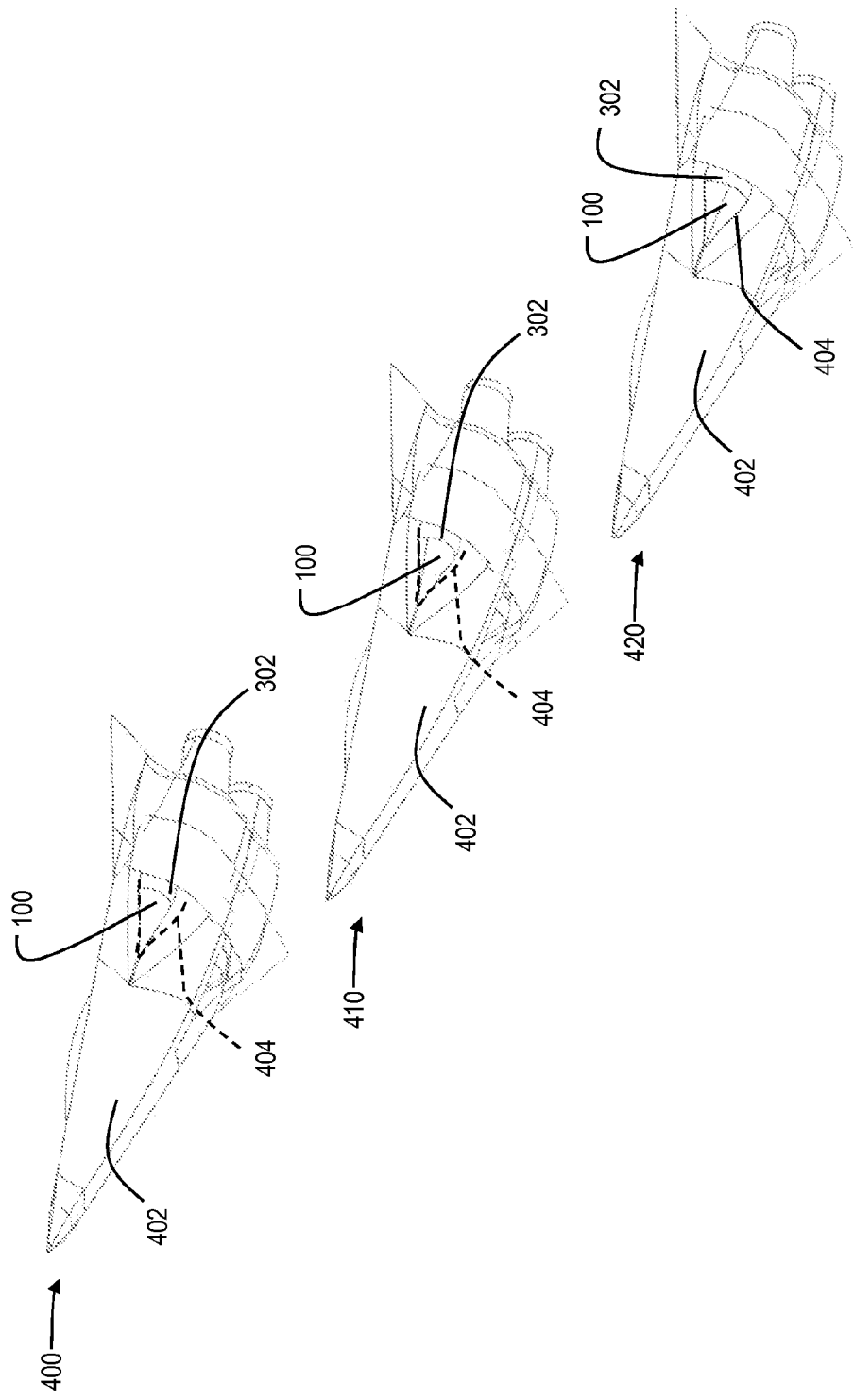
FIG. 4 illustrates a series of partial isometric perspective views of the spiral cone in three positions relative to the airflow inlet of an aircraft engine on an aircraft according to at least one embodiment disclosed herein.

FIG. 4 illustrates a series of partial isometric perspective views of the spiral cone 100 in three positions relative to the airflow engine inlet 302 of an engine on an aircraft 402. A first minimum position 400 illustrates the spiral cone 100 having a minimum compression surface area presented before the engine inlet 302. In this first position, the remainder of the spiral cone 100 is enclosed within the aircraft body and/or aircraft wing assembly of the aircraft 402.

A second or intermediate position 410 illustrates the spiral cone 100 rotated into an intermediate position, (between the first minimum position 400 and a final maximum position 420, described below), where the outer compression surface area has increased from the first minimum position 400 as a result of the spiral cone 100 rotating about its central axis of rotation 102. As the spiral cone 100 is rotated about its central axis of rotation 102, surfaces on the aircraft adjacent to the exposed edges of the spiral cone 100 retract to follow the spiral cone profile to thereby receive the increasing radii portions of the spiral cone 100 as the exposed compression surface area increases. Likewise, when the spiral cone 100 is rotated in an opposite direction to decrease the exposed compression surface area, as aircraft airspeed decreases, the surfaces of the aircraft adjacent the exposed edges of the spiral cone 100 expand to follow the spiral cone profile and thereby follow the decreasing radii portions of the spiral cone 100 and the exposed compression surface area decreases. These adjacent surfaces may be on either side of the exposed compression surface area of the spiral cone 100.

A final maximum position 420 illustrates the spiral cone 100 having a maximum compression surface area presented before the engine inlet 302 as a result of the spiral cone 100 fully rotating about its central axis such that the largest radii portions are now exposed from the aircraft. Maximum peripheral edge portions 404 of the spiral cone 100 are in a maximum, fully extended position when the spiral cone 100 is presenting a maximum compression surface area before the engine inlet 302.

However, as the spiral cone 100 rotates between the maximum compression surface area and the minimum compression surface area, i.e., the first minimum position 400, the peripheral edge portions of the spiral cone are less than the maximum peripheral edge portions 404. To accommodate this variable difference in peripheral edge size as the spiral cone rotates, the aircraft body portion and/or aircraft wing assembly portion may have expanding and contracting portions that tightly close any gaps between the interior of the aircraft 402 and the peripheral edge portions of the spiral cone 100 as it is rotated. Note the maximum peripheral edge portions 404 of the spiral cone in its final maximum position 420 indicated in dotted lines in the first minimum position 400 and second or intermediate position 410. The space between these maximum peripheral edge portions 404 and the actual peripheral edge portions of the spiral cone 100 in the first minimum position 400 and second or intermediate position 410 is covered with the expanding and contracting aircraft body portion and/or aircraft wing assembly portion to close any gap between the aircraft 402 and the peripheral edge of the spiral cone 100.

Figure 5:
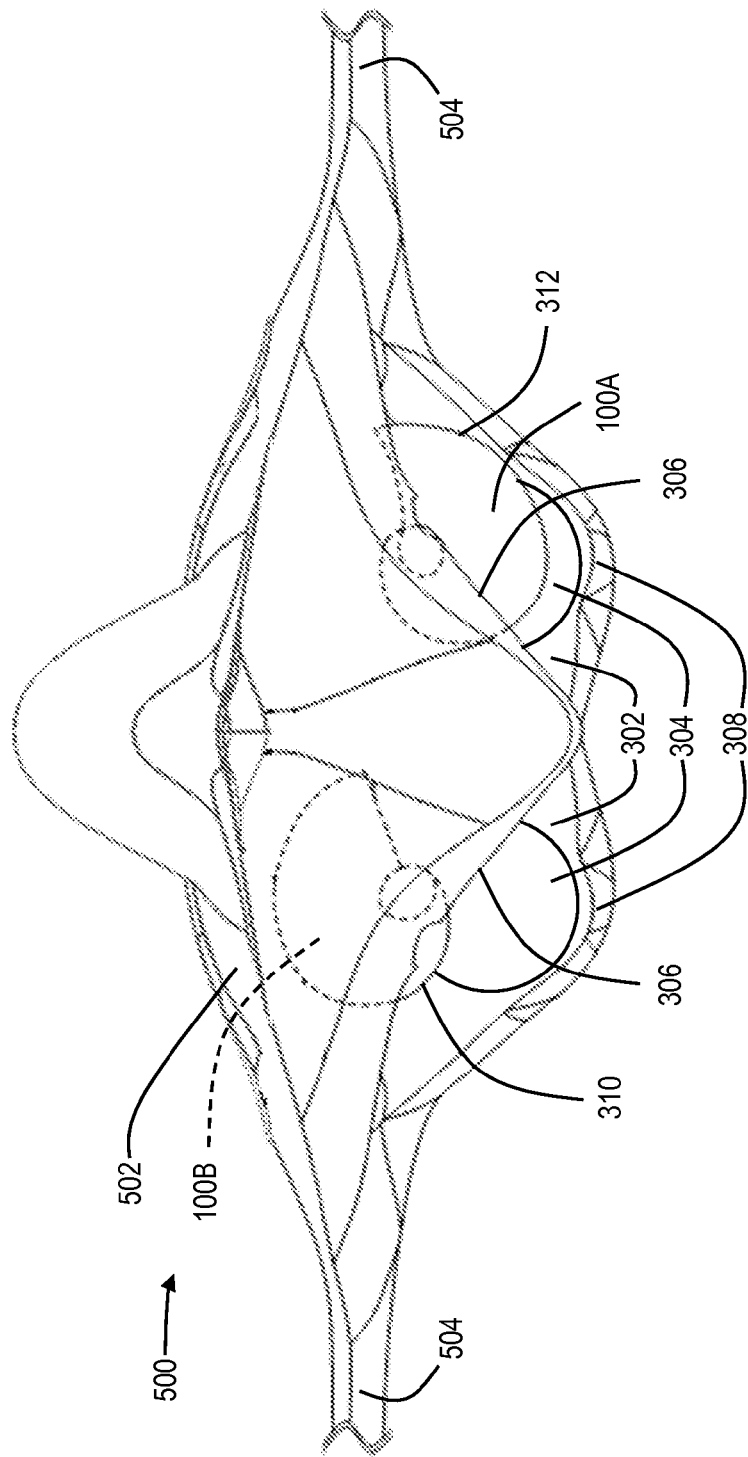
FIG. 5 illustrates a partial forward view of an aircraft including the spiral cone in front of an airflow inlet of an aircraft engine on an aircraft according to at least one embodiment disclosed herein.

FIG. 5 illustrates a front view of an aircraft 500 having a body portion 502, a wing assembly portion(s) 504, aircraft engine compartments 304, engine inlets 302 defined by aircraft planar portions 306 and peripheral cowling 308, and including two spiral cones 100A and 100B in front of each of two engine inlets 302 for each aircraft engine compartment 304. For illustrative purposes only, the left side of the aircraft engine inlet demonstrates the orientation of a spiral cone 100B in its fully rotated and extended position, similar to ref no. 420 in FIG. 4, exposing the maximum amount of compression surface area 312 in front of the engine inlet 302. The right side of the aircraft, for illustrative purposes only, demonstrates the orientation of a spiral cone 100B in its initial retracted position, exposing a minimum amount of compression surface area 310 in front of the engine inlet 302, similar to ref no. 400 in FIG. 4. FIG. 5 demonstrates these two maximum and minimum positions within an aircraft to illustrate the range of motion a spiral cone may take in an aircraft. Since the rotational orientation of the spiral cones is dependent upon aircraft airspeed, and since the airspeed for each engine intake for a dual engine intake aircraft will be relatively equal, the spiral cones will most likely rotate synchronously with each other to present the same compression surface area at any given airspeed.

In summary, one embodiment presented herein includes an aircraft 500 having a body portion 502 connected to a wing assembly portion 504, at least one aircraft engine compartment 304 within at least a portion of one of the body portion 502 and the wing assembly portion 504 and the at least one aircraft engine compartment 304 including an intake portion and an exhaust portion. The aircraft further includes an engine inlet 302 for each aircraft engine compartment 304, defined by a peripheral cowling 308 in one of the body portion 502 and the wing assembly portion 504, the engine inlet 302 oriented in a forward direction to the intake portion of the aircraft engine compartment 304. A spiral cone 100 if further included and positioned proximate the engine inlet 302, the spiral cone 100 including a variable compression surface area that compresses airflow immediately in front of the engine inlet 302. The variable compression surface area of the spiral cone 100 moves between a smallest amount of compression surface area 310 at an engine inlet airspeed of approximately Mach 1.5 or less, and a maximum amount of compression 312 surface area at an engine inlet airspeed of approximately Mach 2.5 or more.

Figure 6:
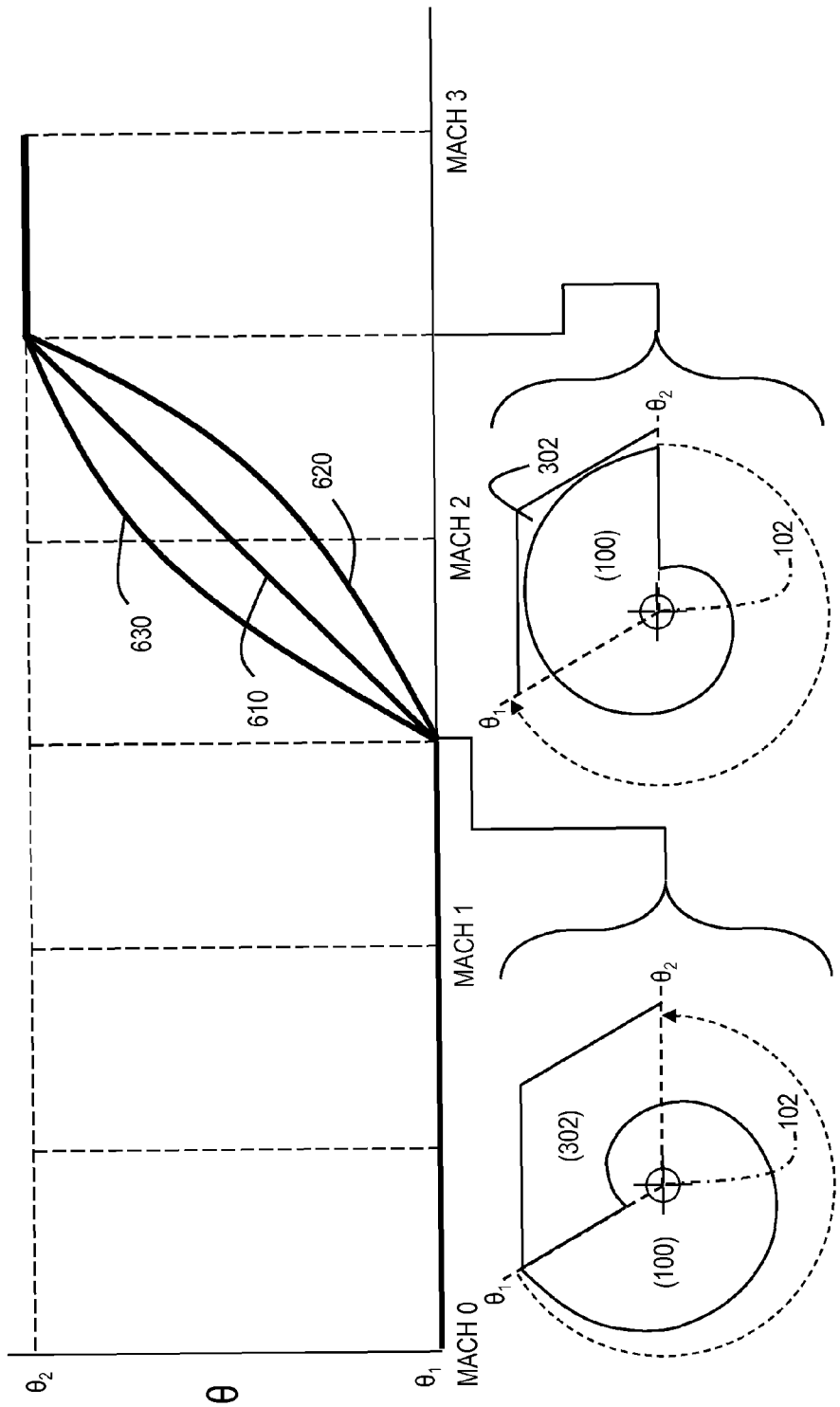
FIG. 6 illustrates a graph of engine inlet airspeed vs. spiral cone angular displacement and corresponding schematic diagrams.

FIG. 6 illustrates a graph of engine inlet airspeed vs. spiral cone angular displacement and corresponding schematic diagrams. Graph 600 illustrates representative plots of angular displacement of spiral cone between airspeeds of Mach 0 and Mach 3. Between Mach 0 and Mach 1.5, the angular displacement of the spiral cone 100 remains in its initial state, or $\theta_1$, in front of the engine inlet 302. As airspeed increases above Mach 1.5, the spiral cone 100 begins to rotate about its central axis of rotation 102, (and in this illustration in FIG. 6, in a counter-clockwise manner). The angular displacement of the spiral cone 100 between Mach 1.5 and 2.5 may follow a linear relationship 610 to the engine inlet airspeed, a negatively biased non-linear relationship 620, or a positively biased non-linear relationship 630 to the engine inlet airspeed.

Figure 7:
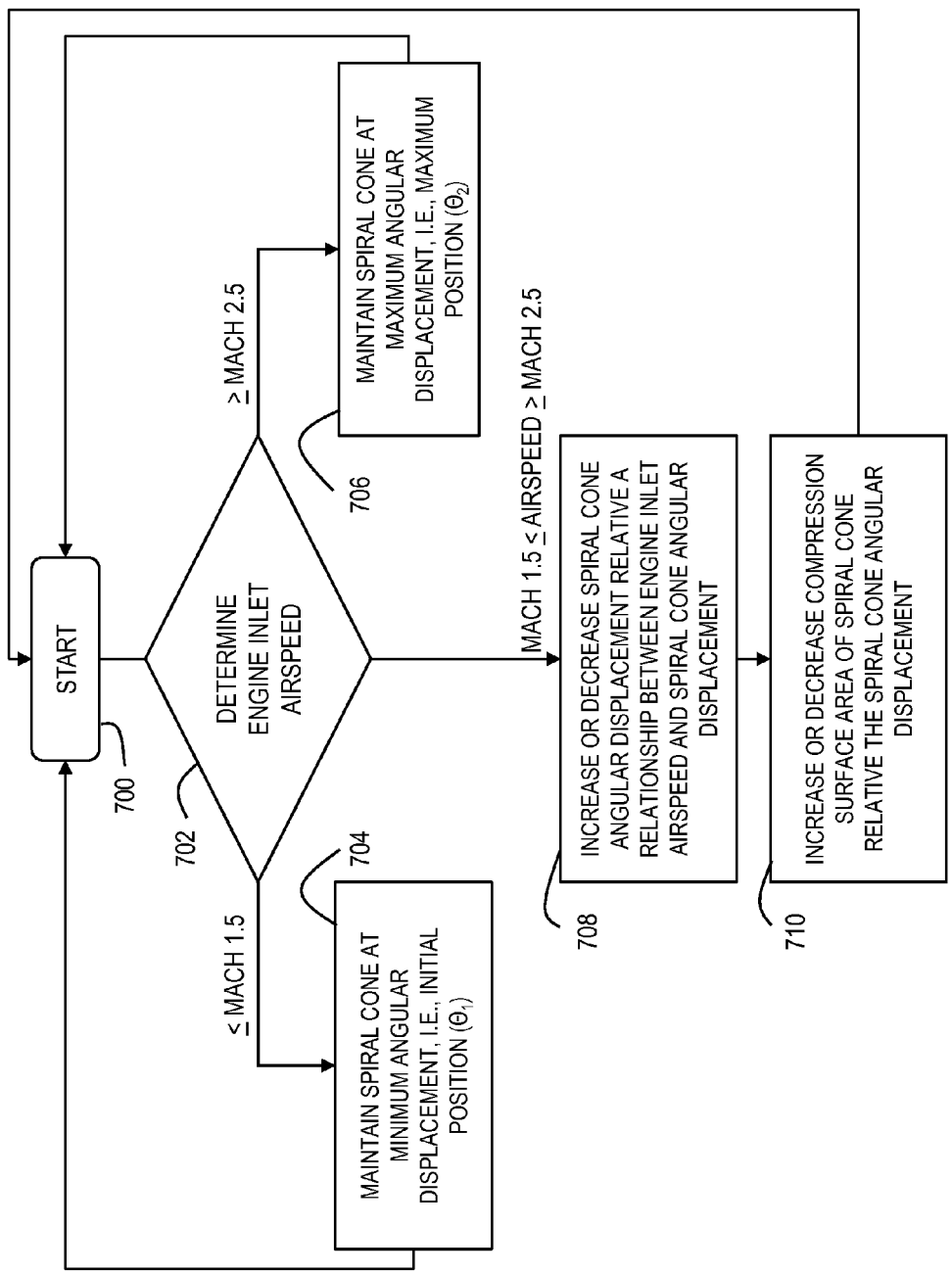
FIG. 7 illustrates a logic flowchart diagram of a method of operation according to at least one embodiment disclosed herein.

FIG. 7 illustrates a logic flowchart diagram of a method of operation according to at least one embodiment disclosed herein. The method starts at 700 and determines the engine inlet airspeed 702. If the engine inlet airspeed is less than or equal to approximately Mach 1.5, then maintain the spiral cone 100 at its minimum angular displacement 704, similar to its initial position, $\theta_1$ in FIG. 6. If the engine inlet airspeed is greater or equal to approximately Mach 2.5, then maintain the spiral cone 100 at its maximum angular displacement 706, similar to its maximum position $\theta_2$ in FIG. 6. If the engine inlet airspeed is between approximately Mach 1.5 and Mach 2.5, then increase or decrease the angular displacement of the spiral cone relative to a relationship between the engine inlet airspeed and the spiral cone angular displacement 708. As a result, the compression surface area of the spiral cone 100 will be either increased or decreased based upon the spiral cone's angular displacement 710, and the airflow immediately before the engine inlet will be either compressed or decompressed, respectively.

In summary, one embodiment presented herein includes a method of operating an aircraft including at a first engine inlet airspeed, presenting a minimum compression surface area of a spiral cone to an airflow positioned forward of an engine inlet and compressing the airflow at the first engine inlet airspeed against the minimum compression surface area for input to an intake portion of an engine. At a second engine inlet airspeed, presenting another compression surface area of the spiral cone to an airflow positioned forward of the engine inlet, the other compression surface area including a larger surface area than the minimum compression surface area of the spiral cone, and compressing an airflow at the second engine inlet airspeed against the other compression surface area for input to the intake portion of the engine. Additionally, the method may include increasing a size of obstruction of a portion of the engine inlet as the spiral cone is rotated in a first rotational direction, and decreasing the size of obstruction of a portion of the engine inlet as the spiral cone is rotated in a second rotational direction, opposite the first rotational direction. Furthermore, the method may include presenting the minimum compression surface area of the spiral cone at an engine inlet airspeed of approximately Mach 1.5 or less, and presenting a maximum compression surface area at an engine inlet airspeed of approximately Mach 2.5 or more.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A system comprising:
    an aircraft engine compartment configured to house an engine including an intake portion;
    an engine inlet, oriented in a forward direction to the intake portion, the engine inlet defined by a peripheral cowling that directs airflow to the intake portion of the aircraft engine;
and
    a spiral cone positioned proximate the engine inlet, the spiral cone including a variable compression surface area that directs airflow into the engine inlet, where an orientation of the spiral cone relative to the engine inlet being selectively controlled to change an amount of available area in front of the engine inlet for airflow to the intake portion, the orientation of the spiral cone being dependent on an airspeed at the engine inlet.

2. The system of claim 1, wherein the spiral cone includes a radius that increases one of linearly and parabolically in a forward-to-aft direction.

3. The system of claim 1, wherein the spiral cone rotates about a forward-to-aft direction central rotational axis.

4. The system of claim 1, wherein the spiral cone rotates between a first position at a first engine inlet airspeed, and a second position at a second engine inlet airspeed.

5. The system of claim 4, wherein the first position of the spiral cone obstructs a first portion of area of the engine inlet, and the second position of the spiral cone obstructs the first portion of area and a second portion of area of the engine inlet.

6. The system of claim 1, wherein the variable compression surface area of the spiral cone moves between a first compression surface area and a second compression surface area, the second compression surface area being larger than the first compression surface area.

7. An aircraft comprising:
    an aircraft body connected to a wing assembly;
    at least one engine compartment within at least a portion of one of the aircraft body and the wing assembly, the at least one engine compartment configured to house an engine including
    an intake portion;
    an engine inlet, for each at least one engine, defined by a peripheral cowling in at least another portion of one of the aircraft body and the wing assembly, the engine inlet oriented in a forward direction to the intake portion; and
    a spiral cone positioned proximate the engine inlet, the spiral cone including a variable compression surface area that compresses airflow into the engine inlet, where an orientation of the spiral cone relative to the engine inlet being selectively controlled to change an amount of available area in front of the engine inlet for airflow to the intake portion, the orientation of the spiral cone being dependent on an airspeed at the engine inlet.

8. The aircraft of claim 7, wherein the spiral cone includes a radius that increases one of linearly and parabolically in a forward-to-aft direction.

9. The aircraft of claim 7, wherein the spiral cone rotates about a central rotational axis in a forward-to-aft direction.

10. The aircraft of claim 7, wherein the spiral cone rotates between a first position at a first engine inlet airspeed, and a second position at a second engine inlet airspeed.

11. The aircraft of claim 10, wherein the first position of the spiral cone obstructs a first portion of area of the engine inlet, and the second position of the spiral cone obstructs the first portion of area and a second portion of area of the engine inlet.

12. The aircraft of claim 7, wherein the variable compression surface area of the spiral cone moves between a first compression surface area and a second compression surface area, the second compression surface area being larger than the first compression surface area.

13. The aircraft of claim 7, wherein the variable compression surface area of the spiral cone moves between a minimum compression surface area at an engine inlet airspeed of approximately Mach 1.5 or less, and a maximum compression surface area at an engine inlet airspeed of approximately Mach 2.5 or more.

14. The aircraft of claim 7, wherein a cross sectional profile of the spiral cone in an orthogonal direction to the forward direction includes a logarithmic spiral.

15. A method of operating an aircraft comprising:
    at a first engine inlet airspeed, presenting a first compression surface area of a variable compression surface area spiral cone to an airflow positioned forward of an engine inlet of an aircraft engine mounted with an engine compartment;

compressing the airflow at the first engine inlet airspeed against the first compression surface area for input to an intake portion of the engine inlet of the aircraft engine;

at a second engine inlet airspeed, selectively controlling an orientation of the spiral cone dependent on the second engine inlet airspeed to present a second compression surface area of the variable compression surface area spiral cone to an airflow positioned forward of the engine inlet of the aircraft engine, the second compression surface area including a larger surface area than the first compression surface area of the variable compression surface area spiral cone thereby changing an amount of available area in front of the engine inlet for airflow to the intake portion; and compressing an airflow at the second engine inlet airspeed against the second compression surface area for input to the intake portion of the engine inlet of the aircraft engine.

16. The method of claim 15, wherein the presenting the second compression surface area of the spiral cone further includes:

rotating the spiral cone to a first position about a forward-to-aft direction central rotational axis.

17. The method of claim 15, further includes:

rotating the spiral cone about a forward-to-aft direction central rotational axis as a function of airspeed at the engine inlet.

18. The method of claim 17, further includes:

increasing a size of obstruction of a portion of the engine inlet as the spiral cone is rotated in a first rotational direction; and decreasing the size of obstruction of a portion of the engine inlet as the spiral cone is rotated in a second rotational direction, opposite the first rotational direction.

19. The method of claim 15, further includes:

providing the spiral cone that includes a cross sectional profile of a logarithmic spiral in an orthogonal direction to the forward direction.

20. The method of claim 15, further includes:

presenting the first compression surface area of the spiral cone at an engine inlet airspeed of approximately Mach 1.5 or less; and presenting a second compression surface area at an engine inlet airspeed of approximately Mach 2.5 or more.

* * * * *